Nov. 24, 1936.  T. B. WINSOR ET AL  2,061,691
EARTHWORKING TOOL
Filed Jan. 16, 1936
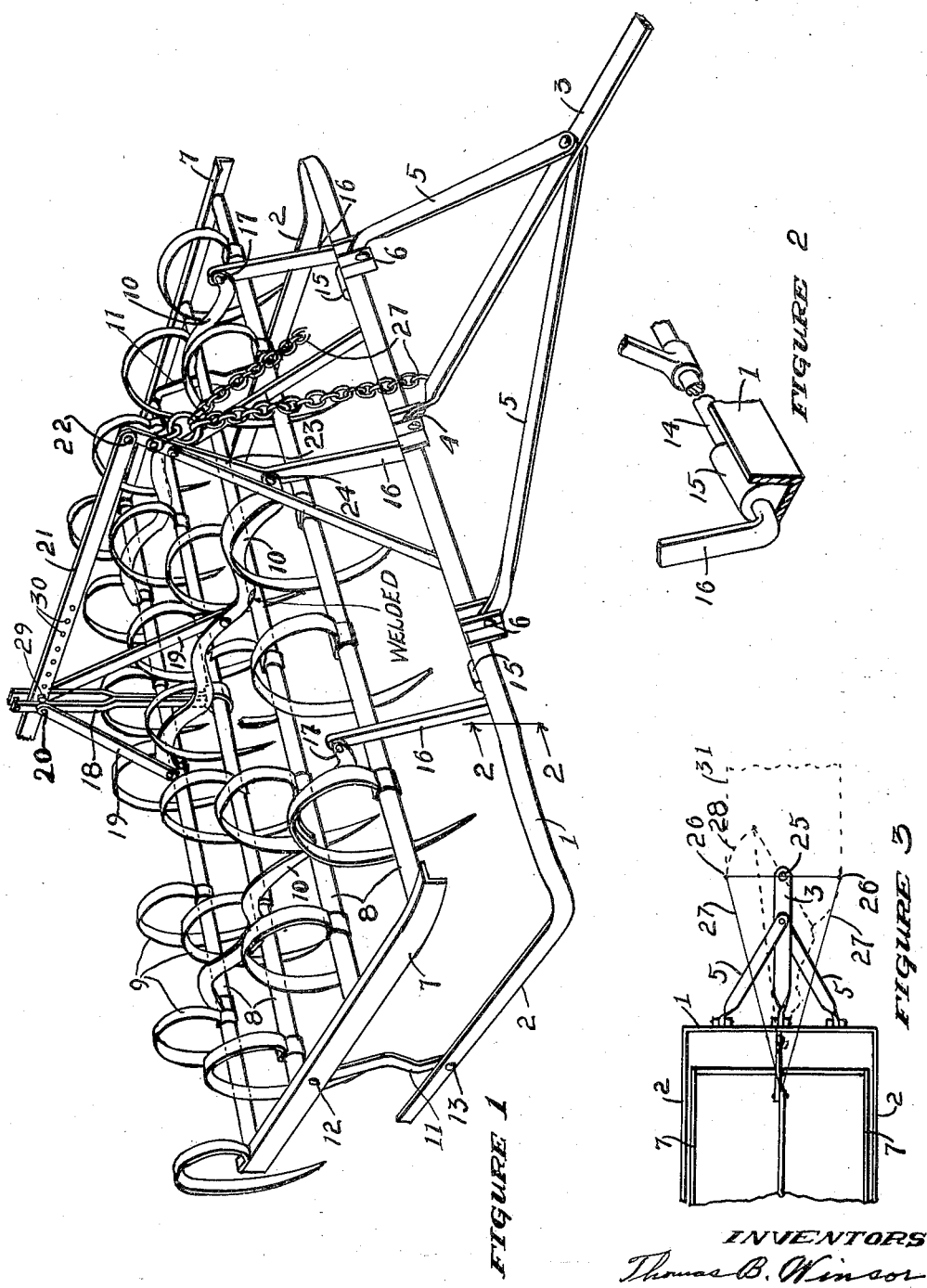

Patented Nov. 24, 1936

2,061,691

UNITED STATES PATENT OFFICE 2,061,691

EARTHWORKING TOOL

Thomas B. Winsor and George B. Winsor, Milpitas, Calif.

Application January 16, 1936, Serial No. 59,384

5 Claims. (Cl. 55—33)

The present invention relates particularly to tools of the cultivator and harrow type.

It is the principal object of the invention to provide a tool of the character indicated so constructed and arranged that a turning movement of the pulling means will automatically raise the working part of the tool with respect to the ground.

It is another object of the invention to provide a tool of the character indicated wherein the working portion of the tool may be automatically elevated with respect to the ground when the pulling means turns either to the right or left of a given straight line of travel, and automatically restored to its original working position when the said pulling means returns to said straight line of travel.

It is also an object of the invention to provide a tool of the character indicated that will be economical to manufacture, simple in form and construction, strong and durable, and highly efficient in its practical application.

In the drawing:

Figure 1 is a perspective illustration of a tool embodying our invention.

Figure 2 is a perspective view at 2—2 on Figure 1, partly in section and parts being broken away.

Figure 3 is a diagrammatical illustration of a portion of the tool and showing its mode of operation.

In the particular embodiment of the invention herein disclosed we show at 1 the base frame including shoes 2 which ride over the surface of the ground. At 3 is a tongue pivotally connected to frame 1 as at 4 and fitted with braces 5 which are also pivotally connected to frame 1 as at 6 so that the tongue may swing in a vertical plane.

At 7 and 8 are the side bars and cross connecting members respectively of a second frame, the members 8 having the several spring teeth 9 mounted thereon as shown. Mounted on the members 8 and in parallel relation to side bars 7, are bars 10. There are three bars 10 in the present instance, the central one being disposed midway between sides 7.

The structure 7—10 is mounted on frame 1 by means of links as 11 pivotally mounted on sides 7 and shoes 2 as at 12 and 13, the said links being inclined upwardly and rearwardly from their connections to the shoes. It is further supported at its front end by a shaft 14 pivotally mounted on frame 1 as at 15 and having upstanding legs as 16 pivotally connected to the forward ends of two bars 10 as indicated at 17.

By mounting the frame structure 7—10 on frame 1 as described it is always over balanced, and without other support than the links 11 its own weight causes it to settle down to the shoes 2, the connections 16 causing it at all times to maintain its proper parallel relationship with the shoes 2.

Mounted upon the rear portion of the central bar 10 is an upstanding forked member 18 rigidly supported by braces 19. A bolt 20 passes through the upper ends of the braces and the fork and provides a bearing for a slidable bar 21. The front end of the bar 21 is pivotally connected as at 22 to the upper end of an arm 23. The arm 23 is an extension of a central leg 16 carried by shaft 14 and having pivotal connection with the central bar 10 as at 24, the pivot 24 being in axial alignment with pivots 17.

When attached to a tractor and ready for use the tongue 3 is pivotally connected to the tractor at a central point as indicated at 25, while the upper end of arm 23 is connected to spaced points as 26 on the tractor by means of chains 27. The chains are of such a length that when the tractor and tool are aligned, that is, disposed to travel in a straight line, the structure 7—10 may swing backwardly and downwardly and seek its own level, the bar 21 sliding freely in forked member 18. This is, of course, the working position of the structure 7—10 with the teeth 9 penetrating the soil, the entire pull on the tool being exerted through tongue 3 to frame 1 and thence through links 11 and legs 16 to structure 7—10.

Since the distance between the tractor and the tool through tongue 3 is fixed, it follows that when the tractor is turned in either direction and assumes an angular position relative to the tool, a direct pull is applied to one of the chains because the point of attachment 26 moves through an arc as at 28 on the far side of the pivotal point 25 from the tool. This movement results in the operation of lever-arm 16—23 to swing the frame 7—8 and the parts mounted thereon into the elevated position shown with the teeth 9 out of contact with the ground. When this adjustment is effected the bar 21 slides forwardly in forked member 18. If it is desired to maintain the parts in the elevated position described a fastening may be inserted between the bar 21 and fork 18. In the present case a pin 29 is shown inserted in a hole 30 in bar 21 and on the forward side of fork 18, thereby preventing the dropping of the frame 7—10 when the tractor and tool are in alignment.

Since the forces acting upon the part 7—10 are transmitted entirely through legs 16 and links 11 it follows that the resistance offered to teeth 9 by the soil through which they are being drawn pulls the frame 7—8 rearwardly and downwardly with respect to frame 1. But since pin 29 is inserted in one of the holes 30 in bar 21 its downward movement is limited and the force acting through bar 21 to fork 18 through the medium of pin 29 operates to maintain structure 7—10 in parallel relation to the ground and maintain the rear end of the structure in proper operative relation to the ground.

It is to be understood, of course, that while we have herein shown and described but one specific embodiment of the invention, changes in form, construction and method of operation may be made within the scope of the appended claims.

We claim:

1. In combination, a tractor, a carrying frame, having rigid draft means connected to the tractor, an earth working implement overlying the frame and mounted for vertical adjustment on said frame and normally engaging the ground, an upstanding centrally disposed lever inserted between the frame and implement for effecting said adjustment, and connections diverging from said lever to spaced points on the tractor on either side of the draft connection thereto whereby a turning movement of the tractor relative to the implement will actuate the lever to elevate the implement against the resistance of the draft means.

2. In combination, a tractor drawn supporting frame, a second frame having earth working devices associated therewith, links pivotally connected to both frames and disposed to incline rearwardly from the first to the second frame, an upstanding bearing member mounted upon the rear portion of the second frame, a lever connecting said frames and set to elevate the second frame with respect to the first frame when operated in the direction of movement of the first frame, a bar pivotally associated with the lever and slidably engaging the bearing member and stop means associated with the bar to engage the bearing member.

3. In combination, a tractor drawn supporting frame, a second frame having earth working devices associated therewith overlying the first frame, links pivotally connected to both frames and disposed to incline rearwardly from the first to the second frame, a lever connecting said frames and set to elevate the second frame with respect to the first frame when operated in the direction of movement of the first frame, and devices for locking said second frame in said elevated position.

4. In combination, a tractor drawn supporting frame, a second frame having earth working devices associated therewith overlying the first frame, links pivotally connected to both frames and disposed to incline rearwardly from the first to the second frame, an upstanding bearing member mounted upon the rear portion of the second frame, legs pivotally mounted on the forward portion of the first frame and pivotally connected to the second frame, an upstanding arm associated with one leg to form a lever, a bar pivotally associated with the lever and slidably engaging the bearing member, and stop means inserted between the bar and bearing member.

5. The combination with a structure comprising a tractor drawn supporting frame having rigid draft means connected to the tractor, a second frame having earth working devices associated therewith and overlying the first frame, and links pivotally connected to both frames and disposed to incline rearwardly from the first to the second frame; of means operable to elevate the second frame relative to the first frame and comprising, connecting elements associated with the second frame and diverging from its central vertical plane to spaced points on the tractor on either side of the draft connection thereto whereby a turning movement of the tractor relative to the frames will actuate one element to elevate the second frame against the resistance of the draft means and first frame.

THOMAS B. WINSOR.
GEORGE B. WINSOR.